United States Patent
Toshimitsu et al.

(10) Patent No.: US 8,064,371 B2
(45) Date of Patent: Nov. 22, 2011

(54) RADIO COMMUNICATION APPARATUS, COMPUTER READABLE STORAGE MEDIUM, AND RADIO COMMUNICATION SYSTEM

(75) Inventors: Kiyoshi Toshimitsu, Tokyo (JP); Masahiro Takagi, Tokyo (JP); Ryoko Matsuo, Tokyo (JP); Toshihisa Nabetani, Kawasaki (JP); Tatsuma Hirano, Tokyo (JP); Tomoko Adachi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/438,845

(22) PCT Filed: Dec. 18, 2008

(86) PCT No.: PCT/JP2008/073663
§ 371 (c)(1),
(2), (4) Date: Feb. 25, 2009

(87) PCT Pub. No.: WO2009/093404
PCT Pub. Date: Jul. 30, 2009

(65) Prior Publication Data
US 2011/0044302 A1 Feb. 24, 2011

(30) Foreign Application Priority Data
Jan. 21, 2008 (JP) ................... 2008-010340

(51) Int. Cl.
*H04B 7/005* (2006.01)
*H04Q 7/00* (2006.01)
(52) U.S. Cl. ........................ 370/278; 370/329
(58) Field of Classification Search ................ 370/277, 370/278, 322, 329, 332, 341, 348, 445
See application file for complete search history.

(56) References Cited

U.S. PATENT DOCUMENTS

| 6,870,808 | B1 * | 3/2005 | Liu et al. ........................ 370/203 |
| 7,224,697 | B2 * | 5/2007 | Banerjea et al. ............... 370/401 |
| 7,583,643 | B2 * | 9/2009 | Smith et al. .................... 370/338 |

(Continued)

FOREIGN PATENT DOCUMENTS
DE 102004030852 8/2006
(Continued)

OTHER PUBLICATIONS 11.14 20/40 MHz BSS Operation, 11.14.1 Terminology and Rules for Operation in 20/40 MHz BSS, IEEE P802.11n/D5.0, May 2008.

(Continued)

*Primary Examiner* — Hongb Cho
(74) *Attorney, Agent, or Firm* — Turocy & Watson, LLP

(57) ABSTRACT

In a radio communication system that simultaneously uses plural radio channels, a radio communication apparatus can quickly secure plural radio channels simultaneously used for radio communication while preventing collision with a radio signal transmitted by another radio communication apparatus so away from the radio communication apparatus that the radio communication apparatus cannot detect radio waves.

A radio communication apparatus STA1 according to the present invention includes a receiving unit 10 which receives, when a first signal is transmitted via each of the plural radio channels, the first signal though at least one or more radio channels among the plural radio channels, and performs carrier sense for each of the plural radio channels used for the transmission of the first signal, a selecting unit 40 which selects a radio channel used for radio communication out of radio channels set in a standby state, and a transmitting unit 20 which transmits a response signal for the first signal via the selected radio channel.

11 Claims, 8 Drawing Sheets

U.S. PATENT DOCUMENTS

| | | | |
|---|---|---|---|
| 2002/0181418 A1* | 12/2002 | Awater et al. | 370/329 |
| 2003/0206532 A1* | 11/2003 | Shpak | 370/322 |
| 2005/0063336 A1* | 3/2005 | Kim et al. | 370/329 |
| 2006/0223541 A1* | 10/2006 | Famolari | 455/450 |

FOREIGN PATENT DOCUMENTS

| | | |
|---|---|---|
| EP | 1804424 | 7/2007 |
| JP | 2005-295238 | 10/2005 |
| JP | 2007-300421 | 11/2007 |
| WO | 2006/134060 | 12/2006 |

OTHER PUBLICATIONS

International Search Report dated May 20, 2009 corresponding to U.S. Appl. No. 12/438,845, filed Feb. 25, 2009.

* cited by examiner

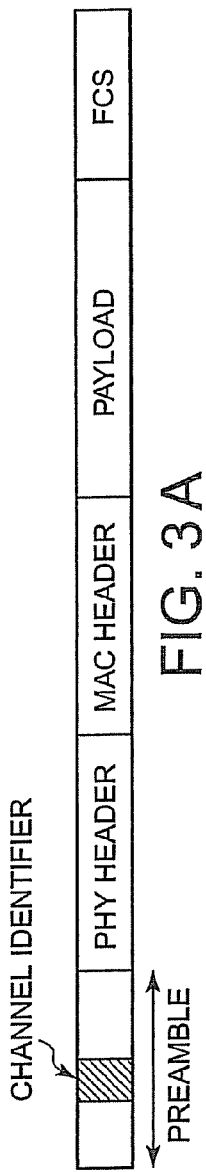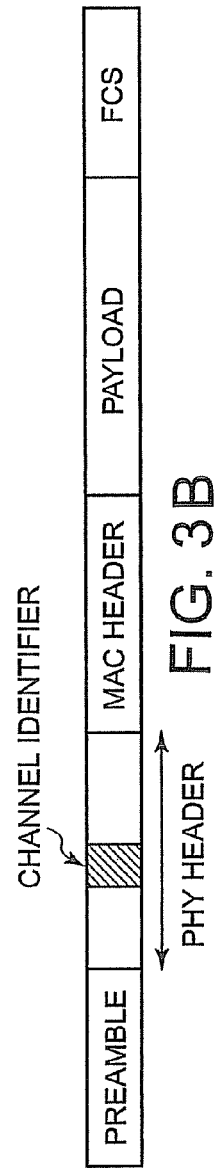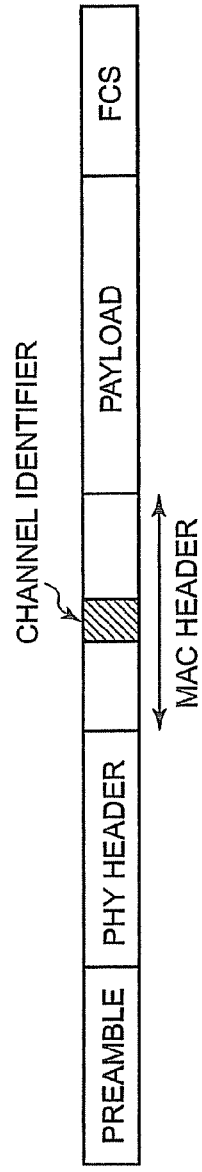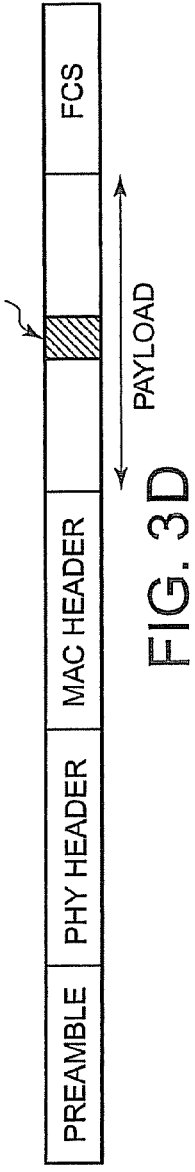

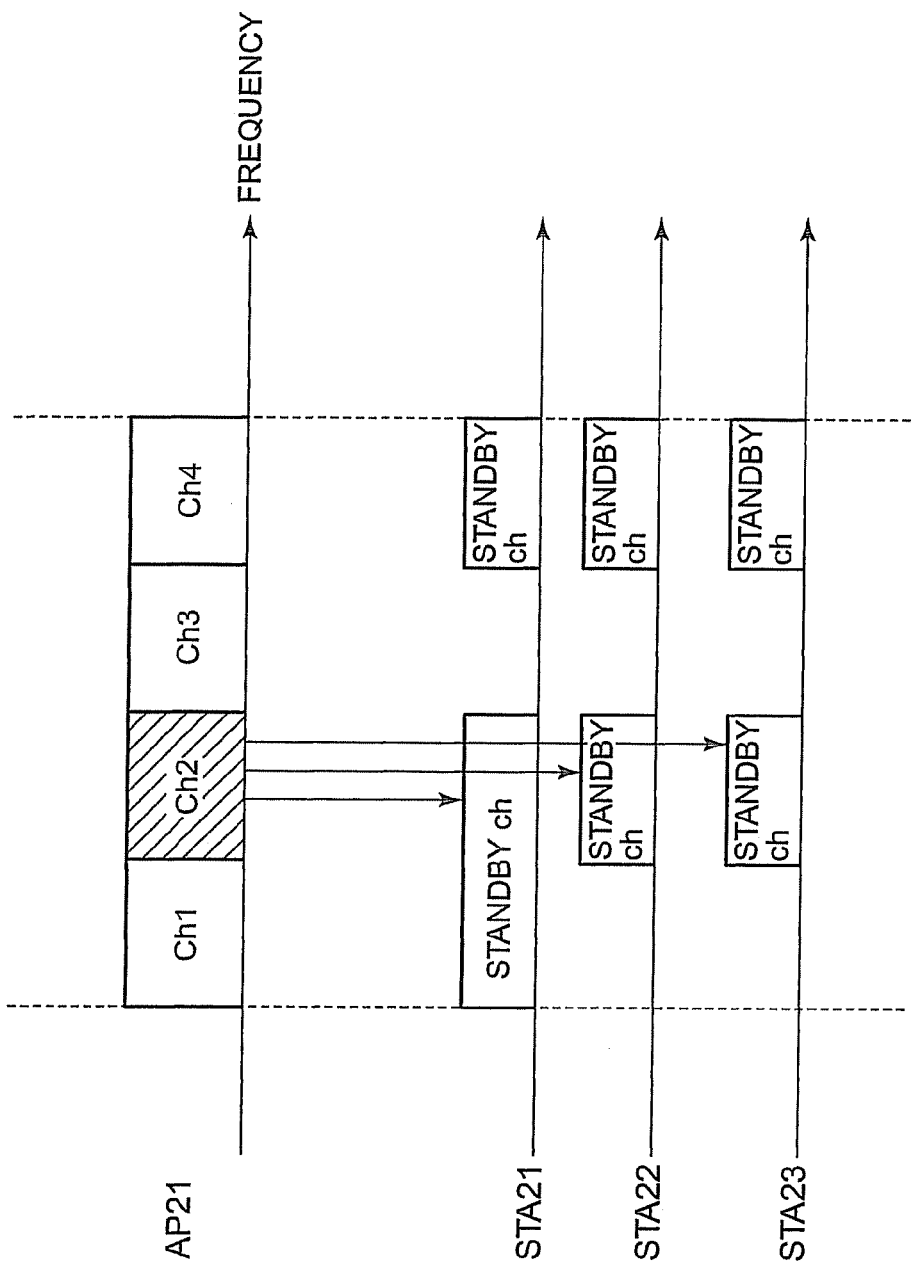

RADIO COMMUNICATION APPARATUS, COMPUTER READABLE STORAGE MEDIUM, AND RADIO COMMUNICATION SYSTEM

TECHNICAL FIELD

The present invention relates to a radio communication apparatus, a computer readable storage medium, and a radio communication system.

BACKGROUND ART

In recent years, there is a stronger demand for an increase in communication speed of radio communication. As one of methods responding to such a request, there is a method of increasing a frequency bandwidth of a radio channel used for radio communication. On the other hand, a radio frequency band is a precious resource used for various applications and is required to be effectively utilized.

In view of such a situation, it is desirable to further allocate a frequency band, which is already used as another application, as a radio channel, realize coexistence with an existing radio technique, and improve efficiency of use of a frequency band as a precious resource. As a method of increasing a frequency bandwidth of a radio channel while improving efficiency of use of a frequency band in this way, a technique for performing radio communication regarding plural radio channels as a radio channel in a wide bandwidth by simultaneously using the plural radio channels is effective.

For example, in the communication standard IEEE802.11n of the next-generation radio LAN, there is proposed a technique for realizing high-speed radio communication regarding two radio channels in 20 MHz width as a radio channel in 40 MHz width by simultaneously using the radio channels.

However, there is a harmful effect in proceeding with such measures to aim at realization of higher-speed radio communication as a radio channel in a wide bandwidth simultaneously using plural radio channels.

For example, JP-A 2005-301591 (Kokai) discloses a technique with which, in a radio communication channel that performs radio communication using plural radio channels, each of radio communication apparatuses performs carrier sense for the plural radio channels and performs radio communication simultaneously using plural radio channels judged as not being used.

In the technique disclosed in JP-A 2005-301591 (Kokai), each of the radio communication apparatuses secures the radio channels, which are judged as not being used as a result of the carrier sense, one by one and, at a stage when the number of radio channels used for radio communication is secured, performs radio communication simultaneously using the plural radio channels.

DISCLOSURE OF THE INVENTION

Problems to be Solved by the Invention

However, the technique disclosed in Patent Document 1 has a problem in that it is necessary to sequentially perform the carrier sense for the radio channels until the number of radio channels used for radio communication is secured and, therefore, it takes time to secure the plural radio channels.

There is also a problem in that the radio communication apparatus and the other radio communication apparatuses cannot use radio channels secured from the start of the securing of the radio channels until the securing of the number of radio channels used for radio communication and, therefore, efficiency of use of the radio channels falls.

These problems become more serious as the number of radio channels simultaneously used in radio communication during radio communication increases.

Moreover, since each of the radio communication apparatuses perform radio communication simultaneously using the plural radio channels, it is more likely that the radio channels used for radio communication overlap in the radio communication apparatus and the other radio communication apparatuses. Therefore, there is also a problem of increasing seriousness in a hidden terminal problem, i.e., the radio communication apparatus and the other radio communication apparatuses, which are so away from the radio communication apparatus that the radio communication apparatus cannot detect radio waves, accidentally and simultaneously transmit radio waves in the same radio channel and collision occurs.

The present invention has been devised in order to solve the problems of the conventional technique and it is an object of the present invention to provide a radio communication apparatus that can quickly secure, in a radio communication system that simultaneously uses plural radio channels, plural radio channels simultaneously used for radio communication while preventing collision with a radio signal transmitted by another radio communication apparatus so away from the radio communication apparatus that the radio communication apparatus cannot detect a radio wave, a computer readable storage medium storing a control program for the radio communication apparatus, and a radio communication system.

Means for Solving the Problems

According to one aspect of the present invention, there is provided a radio communication apparatus that can receive radio waves from a first radio communication apparatus and a second radio communication apparatus and performs radio communication with the first radio communication apparatus via plural radio channels, the first radio communication apparatus and the second radio communication apparatus being unable to detect the radio waves transmitted by the radio communication apparatuses to each other, the radio communication apparatus characterized by comprising:

a receiving unit configured to receive, through at least one or more radio channels among the plural radio channels, a first signal transmitted from the first radio communication apparatus via each of the plural radio channels;

a carrier sense unit configured to detect, for each of the plural radio channels used for the transmission of the first signal, a radio wave transmitted from another radio communication apparatus;

a selecting unit configured to select, when the radio wave transmitted from the second radio communication apparatus is detected by the carrier sense unit, a radio channel other than the plural radio channels used for the transmission of the first signal, which are the radio channels in which the radio wave transmitted from the second radio communication apparatus is detected; and a transmitting unit configured to transmit a response signal for the first signal to the first radio communication apparatus via the radio channel selected by the selecting unit.

According to one aspect of the present invention, there is provided a radio communication apparatus that is so away from a first radio communication apparatus that radio waves transited to each other cannot be detected and performs radio communication with a second radio communication apparatus via plural radio channels, the radio communication apparatus comprising:
a transmitting unit configured to transmit a first signal to the second radio communication apparatus via the plural radio channels; and
a receiving unit configured to be on standby for radio signals in the plural radio channels used in transmitting the first signal, characterized in that
the transmitting unit transmits a radio signal anew using a radio channel though which a response signal for the first signal is transmitted among the plural radio channels in which the receiving unit is on standby.

According to one aspect of the present invention, there is provided a computer readable storage medium storing a control program for a radio communication apparatus that can receive radio waves from a first radio communication apparatus and a second radio communication apparatus and performs radio communication with the first radio communication apparatus via plural radio channels, the first radio communication apparatus and the second radio communication apparatus being unable to detect the radio waves transmitted by the radio communication apparatuses to each other, the control program causes a computer to realize:
a function of receiving, through at least one or more radio channels among the plural radio channels, a first signal transmitted from the first radio communication apparatus via each of the plural radio channels;
a function of detecting, for each of the plural radio channels used for the transmission of the first signal, a radio wave transmitted from another radio communication apparatus;
a function of selecting, when the radio wave transmitted from the second radio communication apparatus is detected, a radio channel other than the plural radio channels used for the transmission of the first signal, which are the radio channels in which the radio wave transmitted from the second radio communication apparatus is detected; and
a function of transmitting a response signal for the first signal to the first radio communication apparatus via the selected radio channel.

According to one aspect of the present invention, there is provided a computer readable storage medium storing a control program for a radio communication apparatus that is so away from a first radio communication apparatus that radio waves transited to each other cannot be detected and performs radio communication with a second radio communication apparatus via plural radio channels, the control program causes a computer to realize:
a function of transmitting a first signal to the second radio communication apparatus via the plural radio channels;
a function of being on standby for radio signals in the plural radio channels used in transmitting the first signal; and
a function of transmitting a radio signal anew using a radio channel though which a response signal for the first signal is transmitted among the plural radio channels in which the computer is on standby.

According to one aspect of the present invention, there is provided a radio communication system comprising: a first radio communication apparatus and a second radio communication apparatus that cannot detect radio waves transmitted to each other; and a third radio communication apparatus that can receive radio waves from the first radio communication apparatus and the second radio communication apparatus and performs radio communication with the first radio communication apparatus via plural radio channels, characterized in that the first radio communication apparatus includes:
a first transmitting unit configured to transmit a first signal to the third radio communication apparatus via the plural radio channels; and
a standby unit configured to be on standby for radio signals in the plural radio channels used in transmitting the first signal,
the third radio communication apparatus includes:
a receiving unit configured to receive, through at least one or more radio channels among the plural radio channels, a first signal transmitted from the first radio communication apparatus;
a carrier sense unit configured to detect, for each of the plural radio channels that the first radio communication apparatus uses for the transmission, a radio wave transmitted from another radio communication apparatus;
a selecting unit configured to select, when the radio wave transmitted from the second radio communication apparatus is detected by the carrier sense unit, a radio channel other than the plural radio channels used for the transmission of the first signal, which are the radio channels in which the radio wave transmitted from the second radio communication apparatus is detected; and
a second transmitting unit configured to transmit a response signal for the first signal to the first radio communication apparatus via the radio channel selected by the selecting unit, and
after the first signal and the response signal for the first signal are transmitted and received between the first radio communication apparatus and the third radio communication apparatus, the first radio communication apparatus and the third radio communication apparatus perform radio communication using the radio channel used for the transmission of the response signal for the first signal.

Advantage of the Invention

According to the present invention, it is possible to quickly secure, in a radio communication system that simultaneously uses plural radio channels, plural radio channels simultaneously used for radio communication while preventing collision with radio signals transmitted by other radio communication apparatus so away from the radio communication apparatus that the radio communication apparatus cannot detect radio waves.

BRIEF DESCRIPTION OF THE DRAWINGS

FIGS. 3A-3D are diagrams showing the structure of a frame in which a channel identifier is described;

FIG. 8 is a diagram showing a state in which radio signals are transmitted from a radio base station to all radio terminals belonging to the same network.

BEST MODE FOR CARRYING OUT THE INVENTION

Embodiments of the present invention are explained below.

First Embodiment

Figure 1:
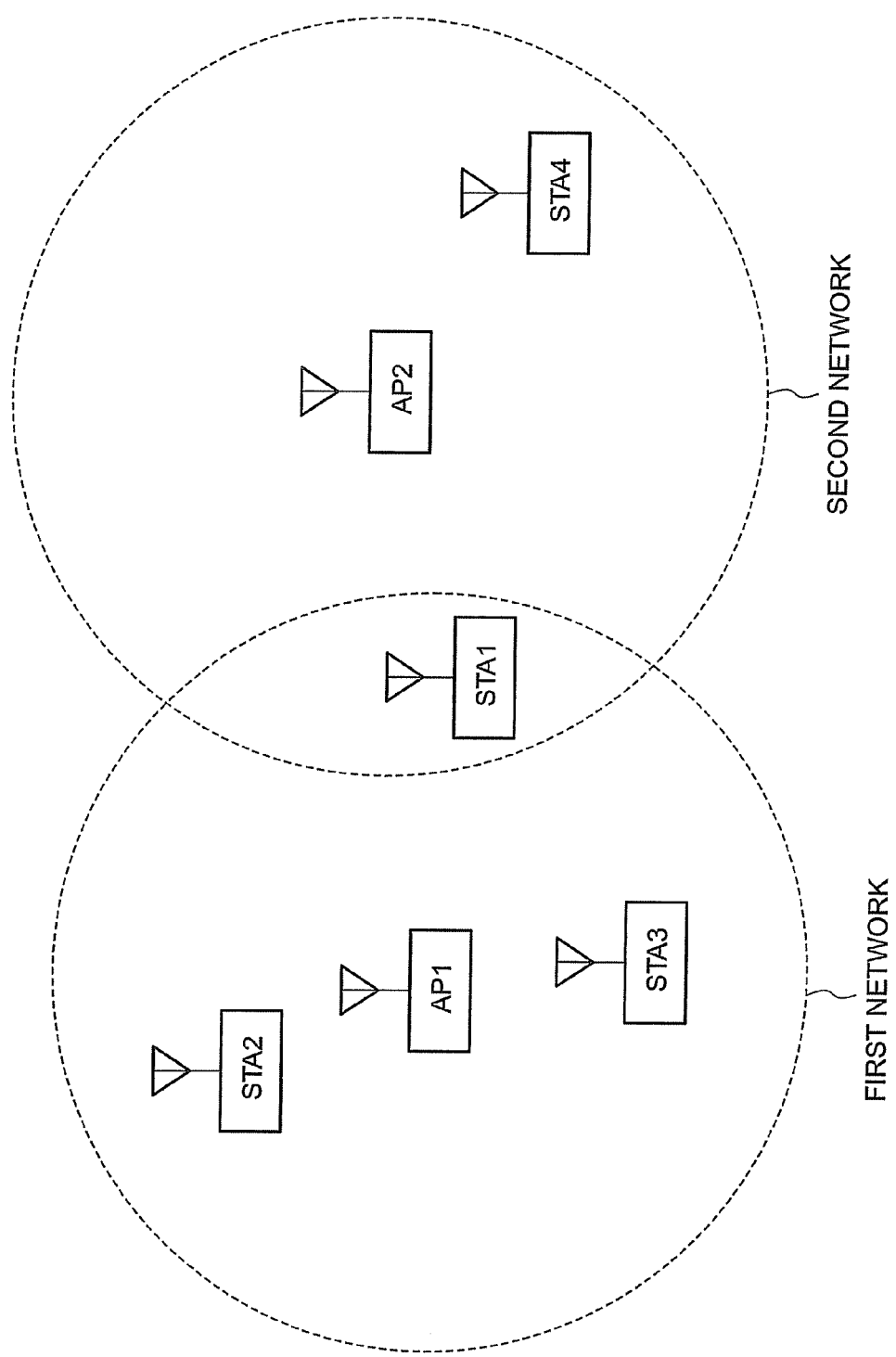
FIG. 1 is a diagram showing a positional relation between radio base stations and radio terminals according to a first embodiment of the present invention.

FIG. 1 is a diagram showing a positional relation between radio base stations AP1 and AP2 and radio terminals STA1 to STA4. The radio base station AP1 and the radio terminals STA1 to STA3 belong to a first network. The radio base station AP1 performs radio communication with the radio terminals STA1 to STA3 using five radio channels, i.e., a first channel to a fifth channel.

The radio base station AP2 and the radio terminal STA4 belong to a second network. The radio base station AP2 performs radio communication with the radio terminal STA4 using the five channels, i.e., the first channel to the fifth channel.

Figure 2:
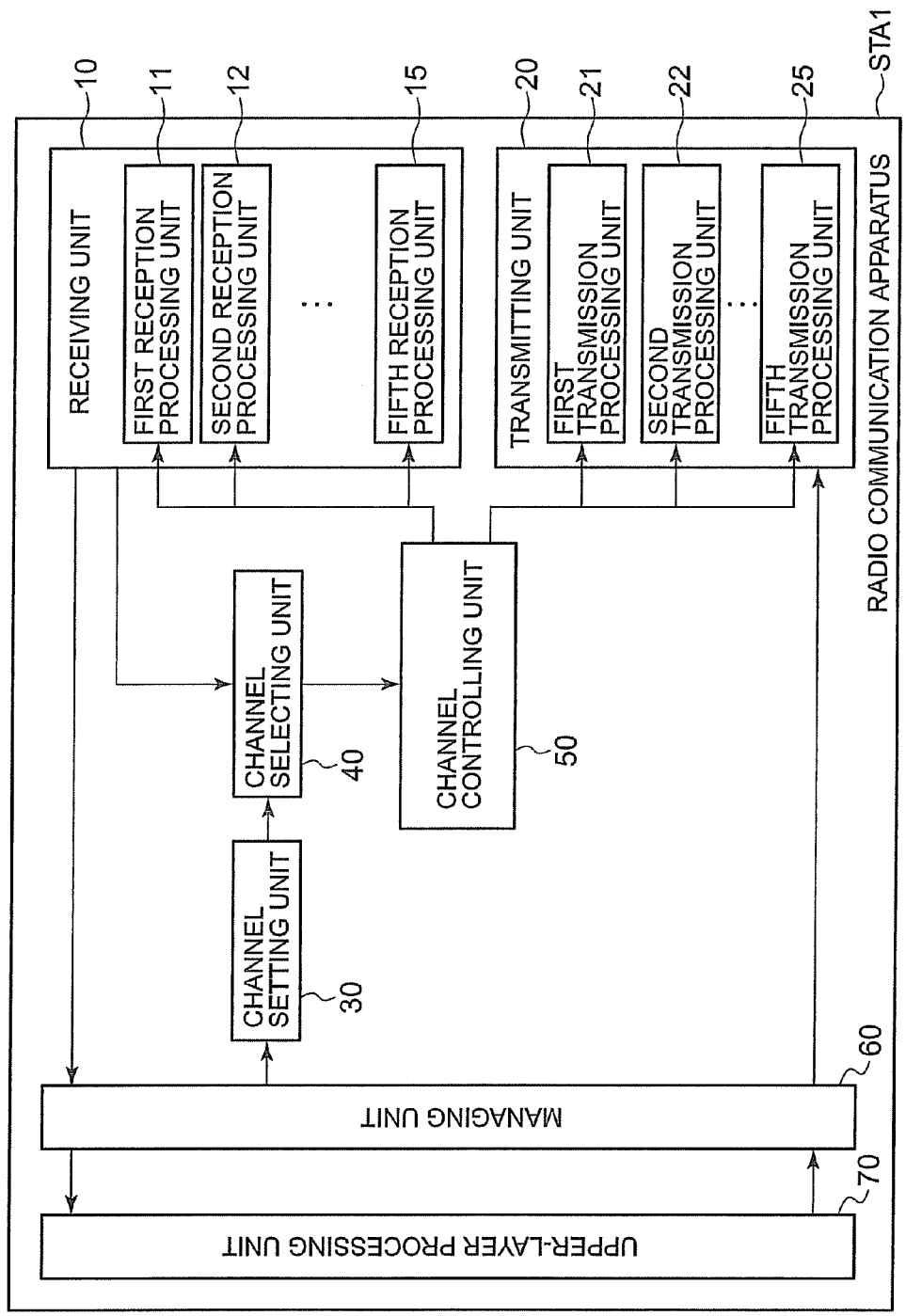
FIG. 2 is a block diagram showing a configuration of the radio terminal according to the first embodiment of the present invention.

FIG. 2 is a block diagram showing a configuration of the radio terminal STA1. Configurations of the radio base stations AP1 and AP2 and the radio terminals STA2 to STA4 are the same as the configuration of the radio terminal STA1.

The radio terminal STA1 includes a receiving unit 10, a transmitting unit 20, a channel setting unit 30, a channel selecting unit 40, a channel controlling unit 50, a managing unit 60, and an upper-layer processing unit 70. The receiving unit 10 includes a first reception processing unit 11 that performs reception processing for a frame via the first channel, . . . , and a fifth reception processing unit 15 that performs reception processing for a frame via the fifth channel. The transmitting unit 20 includes a first transmission processing unit 21 that performs transmission processing for a frame via the first channel, . . . , and a fifth transmission processing unit 25 that performs transmission processing for a frame via the fifth channel.

The receiving unit 10 performs reception processing for frames received via the respective radio channels, i.e., the first channel to the fifth channel, and carrier sense for the respective radio channels, i.e., the first channel to the fifth channel. The receiving unit 10 outputs data and control signals included in the received frames to the managing unit 60.

The transmitting unit 20 performs transmission processing for frames via the respective radio channels, i.e., the first channel to the fifth channel. The transmitting unit 20 performs, for each of the frames, transmission processing for data to be transmitted. When the same frame is transmitted through plural radio channels, the transmitting unit 20 adds channel identifiers, which are information indicating all radio channels used for the transmission of the frame, to the radio channels. Details of the channel identifiers are explained later.

The channel setting unit 30 performs initial setting for a radio channel used for reception (hereinafter referred to as reception channel) and a radio channel used for transmission (hereinafter referred to as transmission channel). The channel setting unit 30 determines initial values for the reception channel and the transmission channel by performing prior negotiation with another radio terminal as a communication partner. A method with which the channel setting unit 30 determines the reception channel and the transmission channel is not limited to the method explained above. For example, radio channels that the transmitting unit 20 and the receiving unit 10 can use for radio communication may be set as the reception channel and the transmission channel.

The channel selecting unit 40 selects, according to a result of the carrier sense performed by the receiving unit 10 and the channel identifiers included in the frames received by the receiving unit 10, a reception channel, a transmission channel, and a radio channel for which the carrier sense is performed (an observation channel) among the first channel to the fifth channel.

The channel controlling unit 50 controls, according to information concerning the reception channel, the transmission channel, and the observation channel selected by the channel selecting unit 40, the first reception processing unit 11 to the fifth reception processing unit 15 and the first transmission processing unit 21 to the fifth transmission processing unit 25.

The managing unit 60 outputs reception data, which is outputted from the receiving unit 10, to the upper-layer processing unit 70. The managing unit 60 performs processing of a control signal (e.g., an Association request signal) outputted from the receiving unit 10. The managing unit 60 outputs transmission data, which is outputted from the upper-layer processing unit 70, to the transmitting unit 20.

Data included in a reception frame is inputted to the upper-layer processing unit 70 from the managing unit 60. The upper-layer processing unit 70 outputs data, which is to be transmitted, to the managing unit 60.

FIG. 3 is a diagram showing channel identifiers added to frames. FIG. 3A is a diagram showing a frame in which a channel identifier is added to a preamble. FIG. 3B is a diagram showing the frame in which the channel identifier is added to a PHY (Physical Layer) header. FIG. 3C is a diagram showing the frame in which the channel identifier is added to an MAC (Media Access Control) header. FIG. 3D is a diagram showing the frame in which the channel identifier is added to a payload.

When the channel identifier is added to the preamble or the PHY header of the frame, a radio terminal on a reception side can acquire the channel identifier at a stage when reception processing for a physical layer is performed. Since error detection using an FCS (Frame Check Sequence) is not performed for the preamble and the PHY header of the frame, the radio terminal on the reception side can acquire the channel identifier earlier by time required for error detection processing.

When the channel identifier is added to the MAC header or the payload of the frame, the radio terminal on the reception side acquires information described in the channel identifier after applying the error detection using the FCS to the MAC header or the payload. Therefore, it is possible to reduce likelihood of acquiring wrong channel identifiers.

Figure 4:
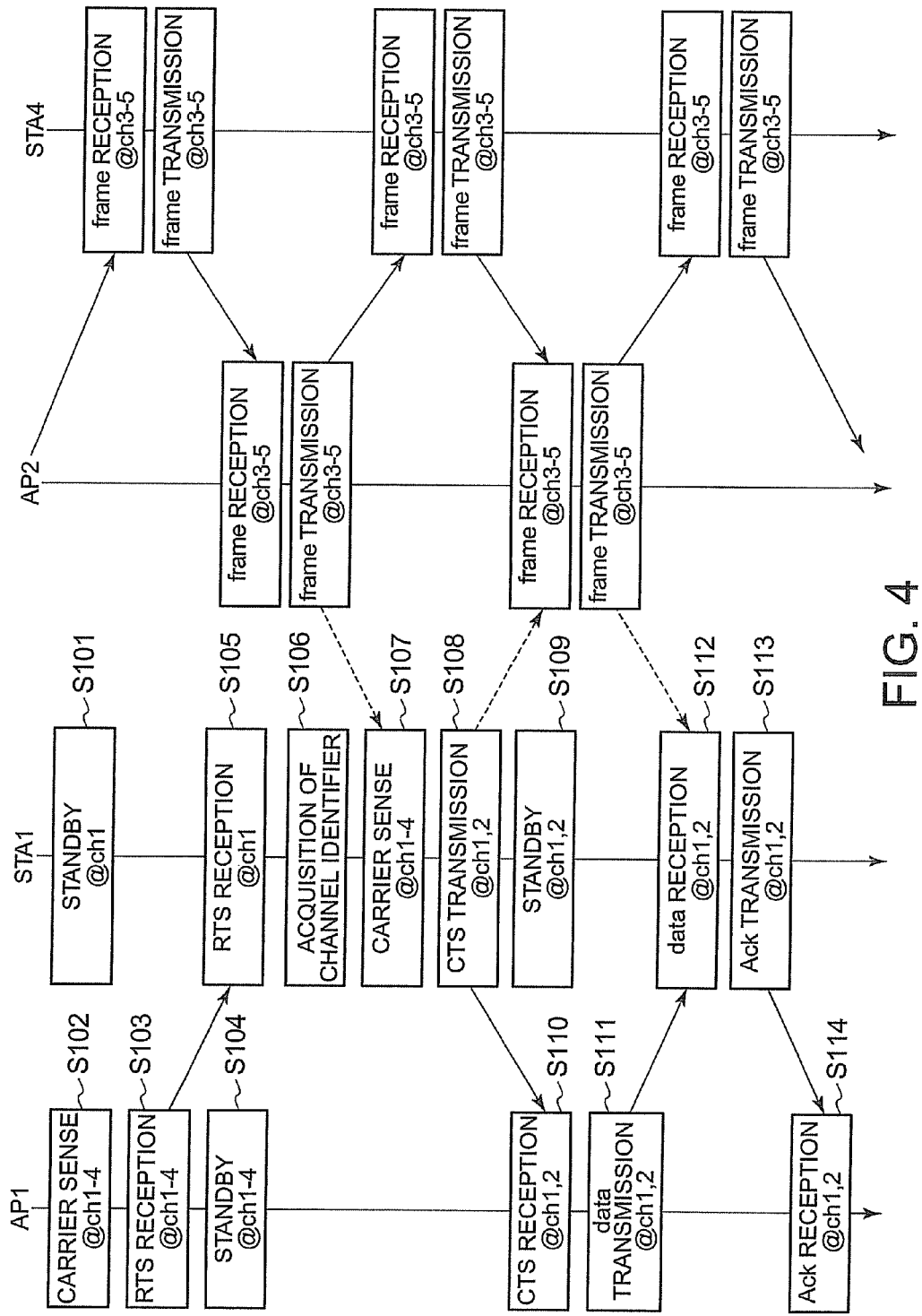
FIG. 4 is a flowchart showing operations of the radio base stations and the radio terminals according to the first embodiment of the present invention.

FIG. 4 is a flowchart showing operations of the radio base stations AP1 and AP2 and the radio terminals STA1 and STA4 that are in the positional relation shown in FIG. 1. Operations of the radio terminals STA2 and STA3 are omitted. A state in which a radio signal transmitted by a radio base station or a radio terminal is propagated to a radio base station or a radio terminal at a destination is indicated by an arrow of a solid line. A state in which a radio signal transmitted by the radio base station or the radio terminal is propagated to a radio base station or a radio terminal other than the destination is indicated by an arrow of a broken line.

It is assumed that the radio base station AP2 and the radio terminal STA4 belonging to the second network frequently perform transmission and reception of frames for long time via the third channel to the fifth channel.

First, it is assumed that the radio terminal STA1 has already transmitted a connection request signal (an Association request signal) to the radio base station AP1 and received a response signal (an Association response signal) to the connection request signal and the radio terminal STA1 has determined that radio channels used between the radio terminal STA1 and the radio base station AP1 are the first channel to the fourth channel. In other words, the channel setting unit 30 of the radio terminal STA1 notifies the channel selecting unit 40 that the first channel to the fourth channel are set as reception channels and transmission channels according to the Association response signal inputted via the managing unit 60. The channel selecting unit 40 selects the first channel to the fourth channel as reception channels according to the notification from the channel setting unit 30 and sets the first reception processing unit 11 to the fourth reception processing unit 14 in a standby state.

When radio communication is not performed between the radio terminal STA1 and the radio base station AP1 for a period equal to or longer than a fixed period, the channel selecting unit 40 selects, in order to reduce reception power, a reception channel to be set in the standby state out of the first channel to the fourth channel. Since the radio base station AP2 and the radio terminal STA4 frequently perform radio communication using the third channel to the fifth channel, the channel selecting unit 40 of the radio terminal STA1 selects a radio channel (e.g., the first channel) other than the third channel to the fifth channel as a reception channel (step S101). Since the reception channel is selected in this way, the radio base station AP2 and the radio terminal STA4 of the other network do not need to perform reception processing for frames to be transmitted and received. Therefore, it is possible to reduce power consumption.

Operations performed when the radio base station AP1 transmits a frame to the radio terminal STA1 are explained below. First, the radio base station AP1 performs carrier sense for the first channel to the fourth channel set as radio channels used for radio communication with the radio terminal STA1 (step S102).

Next, when all the radio channels are IDLE as a result of performing the carrier sense for the first channel to the fourth channel, the radio base station AP1 transmits the same transmission request signals (RTS: Request to Send) via each of the respective first to fourth channels (step S103). The radio base station AP1 describes channel identifiers indicating the first channel to the fourth channel, which are used in transmitting the transmission request signal, in the transmission request signals.

Next, the radio base station AP1 sets all the radio channels (the first channel to the fourth channel) used for transmitting the transmission request signals in the standby state (step S104).

Next, since the radio base station AP1 is on standby in the first channel, the radio terminal STA1 receives the transmission request signal transmitted via the first channel among the transmission request signals transmitted from the radio base station AP1 via the first channel to the fourth channel (step S105).

Next, the receiving unit 10 of the radio terminal STA1 acquires the channel identifiers included in the transmission request signal received by the first reception processing unit 11 (step S106) and outputs the channel identifiers to the channel selecting unit 40.

Next, the channel selecting unit 40 of the radio terminal STA1 selects the first channel to the fourth channel designated by the channel identifier as observation channels and performs carrier sense in the first reception processing unit 11 to the fourth reception processing unit 14 (step S107).

It is assumed that the radio base station AP2 and the radio terminal STA4 frequently perform transmission and reception of frames via the third channel to the fifth channel and a result of the carrier sense by the first reception processing unit 11 to the fourth reception processing unit 14 of the radio terminal STA1 indicates that the first channel and the second channel are IDLE and the third channel and the fourth channel are BUSY.

Next, the channel selecting unit 40 of the radio terminal STA1 selects the first channel and the second channel as transmission channels according to the carrier sense result and transmits a receive ready signal (CTS: Clear to Send) from the first transmission processing unit 21 to the second transmission processing unit 22 (step S108).

Next, the radio terminal STA1 sets all the radio channels (the first channel and the second channel) used for transmitting the receive ready signal in the standby state (step S109).

Next, since the radio terminal STA1 is on standby in the first channel to the fourth channel, the radio base station AP1 receives the receive ready signal transmitted from the radio terminal STA1 via the first channel and the second channel (step S110).

Next, the radio base station AP1 transmits a data frame to the radio terminal STA1 via the radio channels (the first channel and the second channel) that receive the receive ready signal among the radio channels (the first channel to the fourth channel) that transmit the transmission request signals (step S111).

Next, the radio terminal STA1 is on standby in the first channel and the second channel and receives the data frame transmitted from the radio base station AP1 via the first channel and the second channel (step S112).

Next, the radio terminal STA1 transmits an Ack frame to the radio base station AP1 via the first channel and the second channel in the same manner (step S113). Next, the radio base station AP1 receives the Ack frame from the radio base station STA1 via the first channel and the second channel in the same manner (step S114).

In this way, thereafter, transmission and reception of frames are performed between the radio terminal STA1 and the radio base station AP1 via the first channel and the second channel. Even if the radio terminal STA1 and the radio base station AP1 perform the transmission and reception of frames via the first channel and the second channel, the transmission and reception do not collide with transmission and reception of frames between the radio base station AP2 and the radio terminal STA4 belonging to the second network.

As explained above, with the radio terminals STA1 to STA4 and the radio base stations AP1 and AP2 according to the first embodiment, in the radio communication system that simultaneously uses the plural radio channels, it is possible to quickly secure plural radio channels simultaneously used for radio communication while preventing collision with radio signals transmitted by the other radio base station AP2 so away from the radio base station AP1 that the radio base station AP1 cannot detect radio waves.

Since a radio channel is a limited resource, if the radio base stations and the radio terminals simultaneously use plural radio channels for radio communication, it is more likely that the radio channels used between different networks such as the first network and the second network overlap.

However, the radio channel used for the transmission of the transmission request signal by the radio base station AP1, which is the radio channel used for return of the receive ready signal by the radio terminal STA1, is used for radio communication between the radio base station AP1 and the radio terminal STA1. Therefore, the radio channel, for which carrier sense results of both the radio base station AP1 and the radio terminal STA1 are IDLE, is used. It is possible to prevent collision of radio signals transmitted and received through the different networks and solve the hidden terminal problem.

Moreover, even if the radio terminal STA1 is on standby only in the first channel among the first channel to the fourth channel that the radio terminal STA1 uses for radio communication with the radio base station AP1, the first channel and the second channel that can be used at present can be discriminated while a frame is exchanged once between the channels. Therefore, even if the radio terminal STA1 is on standby in one radio channel, it is possible to instantaneously secure plural radio channels and perform radio communication and to simultaneously realize a reduction in reception power and high-speed radio communication.

In the explanation of the first embodiment, the radio base station AP1 transmits the same transmission request signals via the first channel to the fourth channel, respectively (step S103) and the radio terminal STA1 returns the receive ready signal via the first channel and the second channel.

However, the radio base station AP1 may transmit different data frames to the first channel to the fourth channel, respectively, and the radio terminal STA1 may return the Ack frame via the first channel and the second channel. The data frames transmitted by the radio base station AP1 are frames larger in size than the transmission request signals and serve both acquisition of an access right for a radio channel by the radio base station AP1 and information transmission from the radio base station AP1 to the radio terminal STA1.

This makes it possible to establish a radio channel between the radio base station AP1 and the radio terminal STA1 and, at the same time, perform information transmission.

In the explanation of the first embodiment, when the radio terminal STA1 receives the transmission request signal, which is transmitted from the radio base station AP1, through the first channel, the radio terminal STA1 grasps, from the channel identifier included in the transmission request signal, the radio channel that the radio base station AP1 uses to transmit the transmission request signal.

However, the radio terminal STA1 may perform negotiation in advance and grasp information concerning the radio channel that the radio base station AP1 uses in transmitting the transmission request signal. Consequently, the radio base station AP1 does not have to perform processing for describing the channel identifier in the transmission request signal. The radio terminal STA1 does not have to perform the processing for extracting the channel identifier included in the transmission request signal and grasping the radio channel that the radio base station AP1 uses in transmitting the transmission request signal.

In the explanation of the first embodiment, in step S107 in FIG. 4, the channel selecting unit 40 of the radio terminal STA1 selects the first channel and the second channel, which are judged as IDLE as a result of performing the carrier sense for the first channel to the fourth channel, as transmission channels.

However, the channel selecting unit 40 of the radio terminal STA1 can select a radio channel, in which frequency of reception of frames to the other radio communication apparatuses (radio terminals and radio base stations) is low, of the first channel and the second channel as a transmission channel. For example, when frequency of reception of frames to the other radio communication apparatuses through the second channel is larger than that of the first channel, the channel electing unit 40 can select only the first channel as a transmission channel even when the first channel and the second channel are judged as IDLE.

The channel selecting unit 40 of the radio terminal STA1 can select a radio channel, in which frequency of reception of frames to the other radio communication apparatuses is equal to or lower than a threshold, of the first channel and the second channel as a transmission channel. For example, when frequency of reception of frames to the other radio communication apparatuses via the second channel is larger than the threshold, the channel selecting unit 40 can select only the first channel as a transmission channel even when the first channel and the second channel are judged as IDLE.

Consequently, even if radio channels are judged as IDLE at a point when the radio terminal STA1 performs the carrier sense, it is possible to more accurately prevent collision with radio signals transmitted by the other radio communication apparatuses by refraining from, in future, transmitting radio signals via radio channels that are highly likely to be used for radio communication by the other radio communication apparatuses.

In the first embodiment, when the radio terminal STA1 receives frames transmitted and received between the radio base station AP2 and the radio terminal STA4 belonging to the second network and channel identifiers are included in the frame, the radio terminal STA1 can set NAVs (Network Allocation Vectors) for radio channels (the third channel to the fifth channel) designated by the channel identifiers. The radio terminal STA1 sets a period for setting the NAVs to a value same as a value of a Duration field described in an MAC header of the received frame.

When the radio terminal STA1 receives frames transmitted and received between the radio base station AP2 and the radio terminal STA4 belonging to the second network, the radio terminal STA1 can set NAVs (Network Allocation Vectors) for all the radio channels (the first channel to the fourth channel) used for radio communication.

Consequently, it is possible to more accurately prevent collision with radio signals transmitted by the other radio communication apparatuses by refraining from, for a predetermined period after frames to the other radio communication apparatuses are received, transmitting radio signals via radio channels that are highly likely to be used for radio communication by the other radio communication apparatuses.

In the first embodiment, in step S101 in FIG. 4, the channel selecting unit 40 of the radio terminal STA1 selects a radio channel, through which radio signals are not frequently transmitted by the other radio communication apparatuses, as a reception channel.

However, the channel selecting unit 40 of the radio terminal STA1 acquires channel identifiers included in frames transmitted by the other radio communication apparatuses and select a radio channel other than radio channels described in the channel identifiers as a reception channel.

Consequently, it is possible to select a radio channel, which is less likely to receive radio signals to the other radio communication apparatuses, as a reception channel without measuring, for each of radio channels, frequency of transmission of radio signals by the other radio communication apparatuses.

The radio communication apparatus can also be realized by using, for example, a general-purpose computer apparatus as a basic hardware. In other words, the receiving unit 10, the transmitting unit 20, the channel setting unit 30, the channel selecting unit 40, the channel controlling unit 50, the managing unit 60, and the upper-layer processing unit 70 can be realized by causing a processor mounted on the computer apparatus to execute a program. The radio communication apparatus may be realized by installing the program in the computer apparatus in advance or may be realized by storing the program in a storage medium such as a CD-ROM or distributing the program via a network and installing the program in the computer apparatus as appropriate. The radio communication apparatus can be realized by using a storage medium or the like such as a memory incorporated in or externally attached to the computer apparatus, a hard disk, or a CD-R, a CD-RW, a DVD-RAM, or a DVD-R as appropriate.

Second Embodiment

In the first embodiment, the radio base stations AP1 and AP2 and the radio terminals STA1 to STA4 may transmit radio signals via any one of the first channel to the fifth channel as long as negotiation is performed in advance.

In a second embodiment, a radio channel that has to be always used when a radio signal is transmitted and in which radio communication apparatuses always have to be on standby (hereinafter referred to as basic channel) is set for each of networks.

Basic channels for a radio base station AP11 and radio terminals STA11 to STA13 belonging to a first network are a second channel and a fourth channel. A basic channel for a radio base station AP12 and a radio terminal STA14 belonging to a second network is a third channel.

It is assumed that the radio base station AP11 and the radio terminals STA11 to STA13 belonging to a network, for which plural basic channels are set, always use all of the plural basic channels for transmission of radio signals and are always on standby in at least one of the plural basic channels.

A positional relation between the radio base stations AP11 and AP12 and the radio terminals STA11 to STA14 is the same as the positional relation between the radio base stations AP1 and AP2 and the radio terminals STA1 to STA4 shown in FIG. 1.

Figure 5:
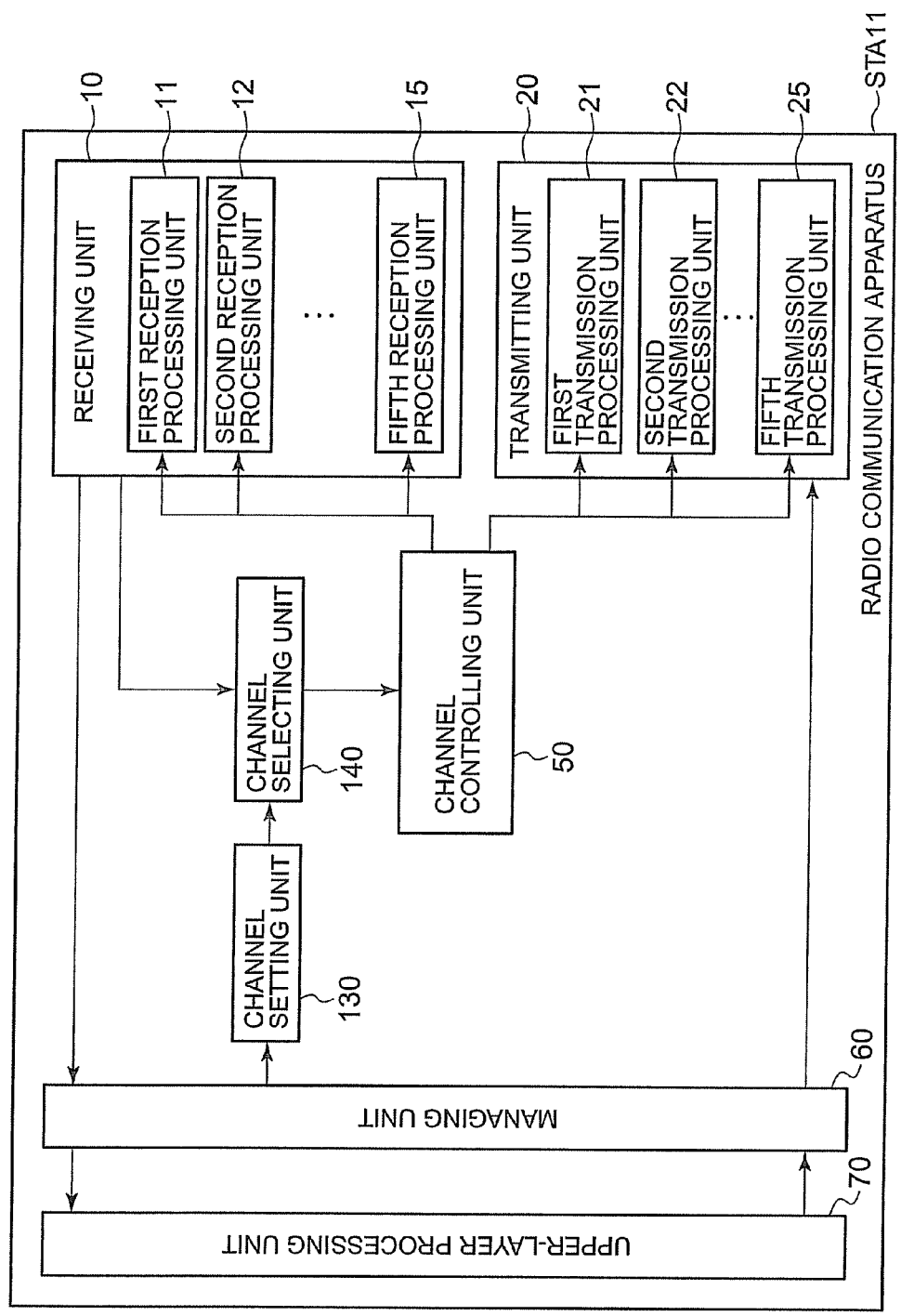
FIG. 5 is a block diagram showing a configuration of a radio terminal according to a second embodiment of the present invention.

FIG. 5 is a block diagram showing a configuration of the radio terminal STA11 according to the second embodiment. Configurations of the radio base stations AP11 and AP12 and the radio terminals STA11 to STA14 are the same as the configuration of the radio terminal STA11.

A channel setting unit 130 according to the second embodiment not only sets initial values for a reception channel and a transmission channel but also determines basic channels for the radio terminal STA11. A channel selecting unit 140 according to the second embodiment selects at least one or more channels among the basic channels as reception channels and selects at least all the basic channels as transmission channels.

The basic channels are determined when the radio base station AP11 notifies the radio terminals STA11 to STA13, which can communicate with the radio base station AP11, of the basic channels using a base station information signal (Beacon, etc.).

The basic channels may be determined by negotiation performed between the radio base station AP11 and the radio terminals STA11 to STA13. Specifically, when the radio terminal STA11 makes connection to the radio base station AP11, the basic channels are determined according to a connection request signal (an Association request signal) and a connection response signal (an Association response signal) exchanged between the radio terminal STA11 and the radio base station AP11. An example of a method of determining basic channels for the radio terminal STA11 is explained below.

First, the radio terminal STA11 transmits an Association request signal in which radio channels (first to fifth channels) that the radio terminal can use for radio communication are described to the radio base station AP11.

Next, the radio base station AP11 transmits an Association response signal in which radio channels (second and fourth channels) set as basic channels of the first network among the radio channels (the first to fifth channels) described in the Association request signal are described.

Next, the radio terminal STA11 sets the radio channels (the second and fourth channels) described in the Association response signal as basic channels for the radio terminal. In other words, the channel setting unit 130 determines basic channels according to the Association response signal received by the receiving unit 10 of the radio terminal STA11 and outputted to the channel setting unit 130 by the managing unit 60.

Basic channels for the radio terminal STA11 are determined by exchanging the Association request signal and the Association response signal in this way.

When all of the radio channels described in the Association request signal are not the basic channels of the first network, the radio base station AP11 returns an Association response signal indicating unconnectability to the radio base station STA11.

Figure 6:
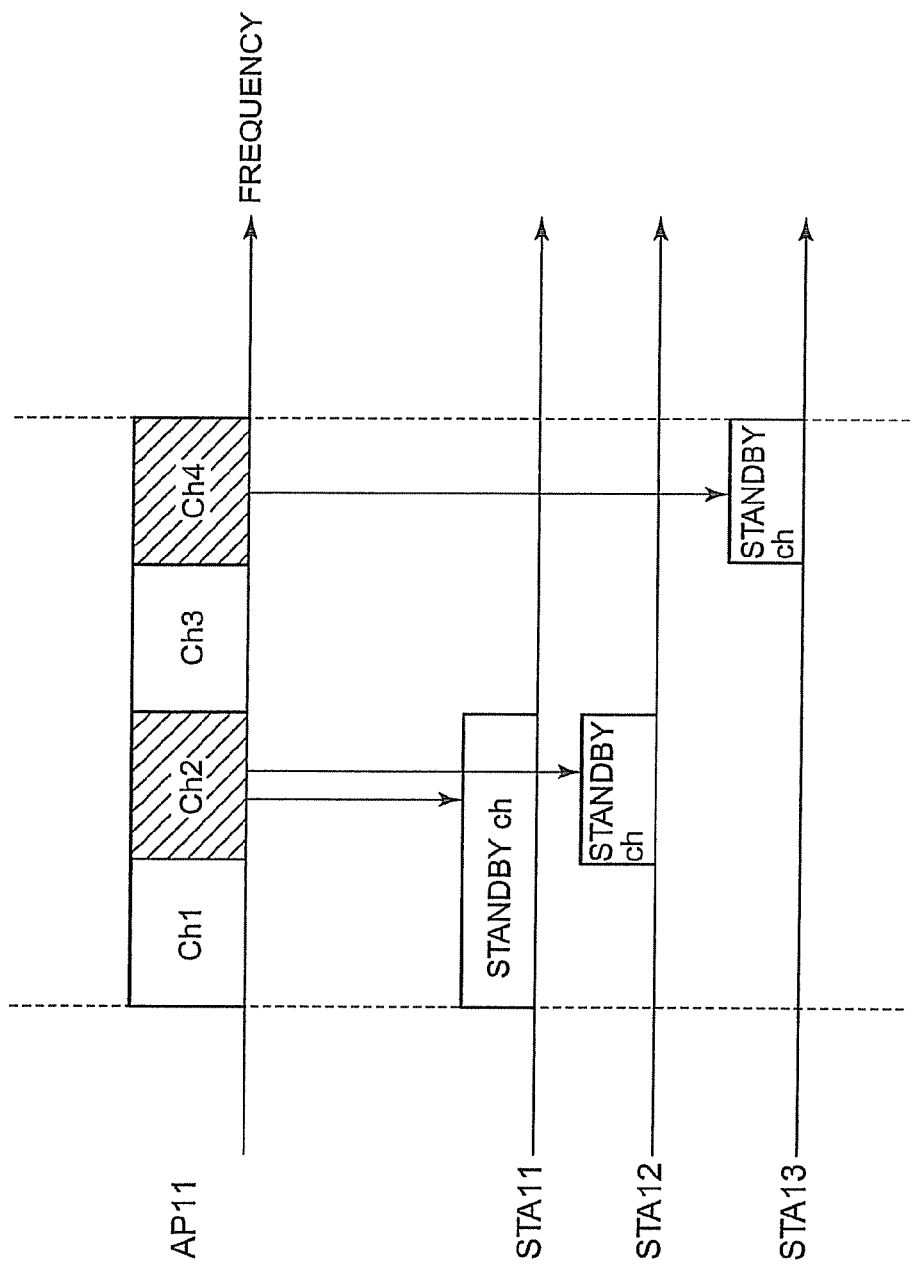
FIG. 6 is a diagram showing a state in which radio signals are transmitted from a radio base station to all radio terminals belonging to the same network.

FIG. 6 is a diagram showing a state in which the same radio signals are transmitted to all the radio terminals STA1 to STA13 belonging to the same network. When the radio base station AP11 transmits radio signals to all the radio terminals STA11 to STA13 belonging to the first network, the radio base station AP11 transmits the radio signals using at least all the basic channels (the second and fourth channels).

Since the second and fourth channels are set as the basic channels of the first network, the radio terminals STA11 to STA13 belonging to the first network always select at least one of the second channel and the fourth channel as a reception channel and set the channel in a standby state.

Therefore, the radio base station AP11 can transmit radio signals to all the radio terminals belonging to the first network by transmitting the same radio signals through a radio channel including all the basic channels.

Since the radio terminals STA11 to STA13 select at least one of the basic channels of the radio terminal as the reception channel and set the channel in the standby state, the radio terminals STA11 to STA13 do not miss a signal transmitted by the radio base station AP11. Therefore, the radio terminals STA11 to STA13 only have to be on standby in the at least one basic channel. It is possible to reduce power supply for maintaining the standby state. In other words, even when the number of radio channels used in performing actual radio communication is increased in order to realize high-speed radio communication, the radio terminals STA11 to STA13 only have to be on standby in the at least one basic channel. The radio base station AP11 does not have to transmit a transmission request signal using all the radio channels. Therefore, it is possible to realize both an increase in communication speed and a reduction in power consumption during standby.

Next, operations of the radio terminal STA11 after a radio signal from the radio base station AP11 is received are explained. Explanation of operations same as those of the radio terminal STA1 according to the first embodiment is omitted. It is assumed that the radio terminal STA11 has already grasped that a basic channel of the second network is the third channel by receiving communication between the radio base station AP12 and the radio terminal STA14.

First, since the first and second channels are selected as reception channels and set in the standby state as shown in FIG. 6, the radio terminal STA11 receives a radio signal from the radio base station AP11 through the second channel.

Next, the receiving unit 10 of the radio terminal STA11 acquires channel identifiers included in the radio signal received from the radio base station AP11 and outputs the channel identifiers to the channel selecting unit 140.

Next, the channel selecting unit 140 of the radio terminal STA11 grasps, from the channel identifiers, the radio channels (the second and fourth channels) that the radio base station AP11 uses for the transmission of the radio signal.

Next, the channel selecting unit 140 of the radio terminal STA11 selects the radio channels that the radio base station AP11 uses for the transmission of the radio signal and the basic channel of the other network (the third channel of the second network) as observation channels and causes the second reception processing unit 12 to the fourth reception processing unit 14 to perform carrier sense.

Thereafter, the radio terminal STA11 returns a CTS signal according to a carrier sense result and performs radio communication as in the first embodiment.

As explained above, with the radio terminals STA11 to STA14 and the radio base stations AP11 and AP12 according to the second embodiment, the radio terminal STA11 performs radio communication using the radio channels that the radio base station AP11 uses for transmission and the basic channel of the other network. Therefore, the radio terminal STA11 can cause the radio base station AP12 to refrain from performing radio communication by transmitting a radio signal to the radio base station AP11 and, at the same time, causing the radio signal to reach the radio base station AP12 of the other network as well. Since the radio terminal STA11 causes the radio base station AP12 to refrain from transmitting a radio signal, it is possible to prevent collision from occurring when the radio base station AP11 and the radio terminal STA11 transmit and receive radio signals.

Third Embodiment

In the second embodiment, when the radio base stations AP11 and AP12 transmit radio signals to all the radio terminals belonging to the network to which the radio base stations belong, the radio base stations AP11 and AP12 transmit the same radio signals using at least all the basic channels.

In a third embodiment, even when radio base stations AP21 and AP22 transmit radio signals to all radio terminals belonging to a network to which the radio base stations belong, the radio base stations AP21 and AP22 only have to transmit the radio signals using at least one of plural basic channels.

Basic channels for the radio base station AP21 and radio terminals STA21 to STA23 belonging to a first network are a second channel and a fourth channel. A basic channel of radio base station AP22 and a radio terminal STA24 belonging to a second network is a third channel.

It is assumed that the radio base station AP21 and the radio terminals STA21 to STA23 belonging to a network for which plural basic channels are set always use at least one of the plural basic channels for transmission of radio signals and are always on standby in all the plural basic channels.

A positional relation between the radio base stations AP21 and AP22 and the radio terminals STA21 to STA24 is the same as the positional relation between the radio base stations AP1 and AP2 and the radio terminals STA1 to STA4 shown in FIG. 1.

Figure 7:
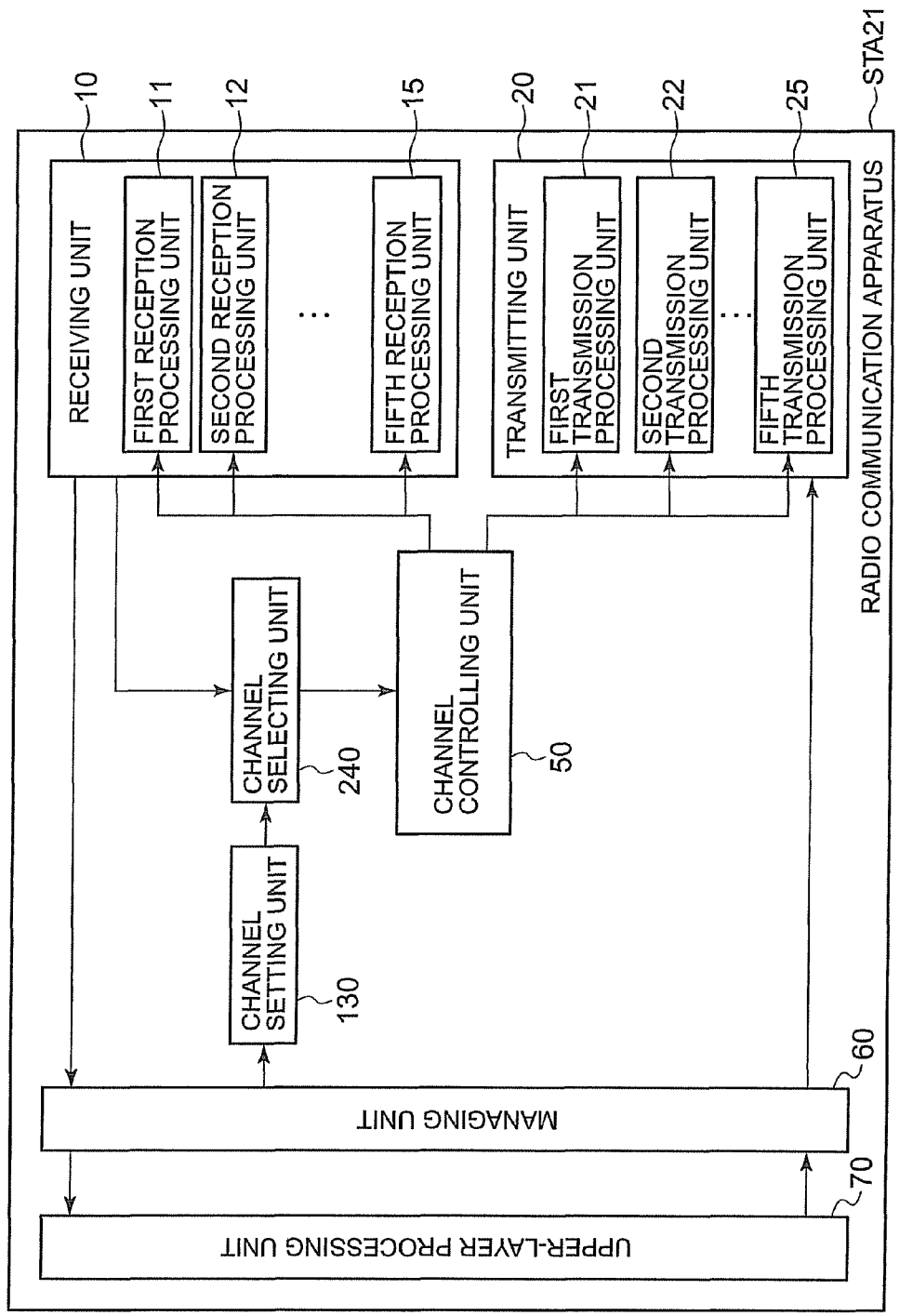
FIG. 7 is a block diagram showing a configuration of a radio terminal according to a third embodiment of the present invention.

FIG. 7 is a block diagram showing a configuration of the radio terminal STA21 according to the third embodiment. Configurations of the radio base stations AP21 and AP22 and the radio terminals STA22 to STA24 are the same as the configuration of the radio terminal STA21.

A channel selecting unit 240 according to the third embodiment selects all basic channels as reception channels and selects at least one of the basic channels as a transmission channel. A method of determining basic channels is as explained in the second embodiment.

FIG. 8 is a diagram showing a state in which the radio base station AP21 transmits the same radio signals to all the radio terminals STA21 to STA23 belonging to the same network. When the radio base station AP21 transmits radio signals to the radio terminals STA21 to STA23 belonging to the first network, the radio base station AP21 transmits the radio signals using at least one (the second channel) of the basic channels.

The second and fourth channels are set as the basic channels for the first network. Therefore, the radio terminals STA21 to STA23 belonging to the first network always select all the basic channels (both the second and fourth channels) as reception channels and set the channels in a standby state.

Therefore, the radio base station AP21 can transmit radio signals to all the radio terminals belonging to the first network by transmitting the radio signals through at least one of the basic channels.

As explained above, with the radio terminals STA21 to STA24 and the radio base stations AP21 and AP22 according to the third embodiment, it is possible to reduce the number of radio channels used in transmitting radio signals to all the radio terminals STA21 to STA23 belonging to the first network and prevent collision with radio communication of the other network (e.g., the second network).

Moreover, it is possible to reduce the number of radio channels that the radio base station AP21 uses in transmitting radio signals to all the radio terminals belonging to the first network. Therefore, it is possible to reduce time required for carrier sense performed before the transmission of the radio signals.

Furthermore, since the radio terminals STA21 to STA23 select only the basic channels of the radio terminals among the radio channels, which the radio terminals can use, as the reception channels and set the channels in the standby state, the radio terminals STA21 to STA23 do not miss a signal transmitted by the radio base station AP21. Therefore, the radio terminals STA21 to STA23 only have to be on standby in all the basic channels. It is possible to reduce power supply for maintaining the standby state.

The present invention is not limited to the embodiments per se. At an implementation stage, it is possible to modify and embody the elements without departing from the spirit of the present invention. Various inventions can be formed by appropriately combining the plural elements disclosed in the embodiments. For example, several elements may be deleted from all the elements described in the embodiments. Moreover, the elements described in the different embodiments may be appropriately combined.

The invention claimed is:

1. A radio communication apparatus that can receive radio waves from a first radio communication apparatus and a second radio communication apparatus and performs radio communication with the first radio communication apparatus via plural radio channels, the first radio communication apparatus and the second radio communication apparatus being unable to detect the radio waves transmitted by the radio communication apparatuses to each other, the radio communication apparatus characterized by comprising:
- a receiving unit configured to receive, through at least one or more radio channels among the plural radio channels, a first signal transmitted from the first radio communication apparatus via each of the plural radio channels;
- a carrier sense unit configured to detect, for each of the plural radio channels used for the transmission of the first signal, a radio wave transmitted from another radio communication apparatus;
- a selecting unit configured to select, when the radio wave transmitted from the second radio communication apparatus is detected by the carrier sense unit, a radio channel other than the plural radio channels used for the transmission of the first signal, which are the radio channels in which the radio wave transmitted from the second radio communication apparatus is detected; and
- a transmitting unit configured to transmit a response signal for the first signal to the first radio communication apparatus via the radio channel selected by the selecting unit,
- wherein channel identifiers indicating the plural radio channels used for the transmission of the first signal by the first radio communication apparatus are included in the first signal, and
- the carrier sense unit detects, for each of the plural radio channels designated by the channel identifiers, a radio wave transmitted from the second radio communication apparatus or the other radio communication apparatus.

2. The apparatus according to claim 1, characterized by further comprising a prohibiting unit configured to prohibit, when the receiving unit receives radio signals communicated between the second radio communication apparatus and the other radio communication apparatus and channel identifiers indicating radio channels through which the radio signals are transmitted, respectively, are described, radio signals from being transmitted by using the radio channels, which are designated by the channel identifiers, for a predetermined period.

3. The apparatus according to claim 2, characterized in that, when the receiving unit receives radio signals communicated between the second radio communication apparatus and the other radio communication apparatus, the prohibiting unit prohibits radio signals from being transmitted by using all the radio channels for a predetermined period.

4. The apparatus according to claim 3, characterized in that the receiving unit is on standby concerning radio channels other than the radio channels, through which the radio signals are prohibited from being transmitted by the prohibiting unit.

5. The apparatus according to claim 1, characterized in that, when the receiving unit receives radio signals communicated between the second radio communication apparatus and the other communication apparatus and channel identifiers indicating radio channels through which the radio signals are transmitted, respectively, are described, the receiving unit is on standby in radio channels other than the radio channels designated by the channel identifiers.

6. A radio communication apparatus that is so away from a first radio communication apparatus that radio waves transited to each other cannot be detected and performs radio communication with a second radio communication apparatus via plural radio channels, the radio communication apparatus comprising:
- a transmitting unit configured to transmit a first signal to the second radio communication apparatus via the plural radio channels; and
- a receiving unit configured to be on standby for radio signals in the plural radio channels used in transmitting the first signal, characterized in that
- the transmitting unit transmits a radio signal anew using a radio channel though which a response signal for the first signal is transmitted among the plural radio channels in which the receiving unit is on standby,
- the second radio communication apparatus and the radio communication apparatus belong to a same network,
- one or more basic radio channels are set for each kind of the network out of the plural radio channels used for radio communication,
- the radio communication apparatus belonging to the network uses radio channels including the basic radio channels when the radio communication apparatus transmits a radio signal, and
- when a plurality of the basic radio channels of the network are set and the receiving unit receives notification to the effect that all the radio communication apparatuses belonging to the network are on standby in all the plural basic radio channels, the transmitting unit transmits radio signals using at least one or more radio channels among the plural basic radio channels.

7. The apparatus according to claim 6, characterized in that, when the plural basic radio channels of the network are set, the transmitting unit transmits a same radio signal for each of the at least one or more radio channels among the plural basic radio channels.

8. The apparatus according to claim 6, characterized in that the transmitting unit transmits radio signals using radio channels including the basic radio channels and basic channels of another network to which the radio communication apparatus does not belong.

9. A radio communication apparatus that can receive radio waves from a first radio communication apparatus and a second radio communication apparatus and performs radio communication with the first radio communication apparatus via plural radio channels, the first radio communication apparatus and the second radio communication apparatus being unable to detect the radio waves transmitted by the radio communication apparatuses to each other, the radio communication apparatus characterized by comprising:
- a receiving unit configured to receive, through at least one or more radio channels among the plural radio channels, a first signal transmitted from the first radio communication apparatus via each of the plural radio channels;
- a carrier sense unit configured to detect, for each of the plural radio channels used for the transmission of the first signal, a radio wave transmitted from another radio communication apparatus;
- a selecting unit configured to select, when the radio wave transmitted from the second radio communication apparatus is detected by the carrier sense unit, a radio channel other than the plural radio channels used for the transmission of the first signal, which are the radio channels in which the radio wave transmitted from the second radio communication apparatus is detected; and
- a transmitting unit configured to transmit a response signal for the first signal to the first radio communication apparatus via the radio channel selected by the selecting unit,
- wherein the selecting unit selects a radio channel in which frequency of detection of a radio wave transmitted from the second radio communication apparatus or the other radio communication apparatus is low among radio channels in which the radio wave transmitted from the second radio communication apparatus or the other radio communication apparatus is not detected.

10. A radio communication apparatus that can receive radio waves from a first radio communication apparatus and a second radio communication apparatus and performs radio communication with the first radio communication apparatus via plural radio channels, the first radio communication apparatus and the second radio communication apparatus being unable to detect the radio waves transmitted by the radio communication apparatuses to each other, the radio communication apparatus characterized by comprising:
- a receiving unit configured to receive, through at least one or more radio channels among the plural radio channels, a first signal transmitted from the first radio communication apparatus via each of the plural radio channels;
- a carrier sense unit configured to detect, for each of the plural radio channels used for the transmission of the first signal, a radio wave transmitted from another radio communication apparatus;
- a selecting unit configured to select, when the radio wave transmitted from the second radio communication apparatus is detected by the carrier sense unit, a radio channel other than the plural radio channels used for the transmission of the first signal, which are the radio channels in which the radio wave transmitted from the second radio communication apparatus is detected; and
- a transmitting unit configured to transmit a response signal for the first signal to the first radio communication apparatus via the radio channel selected by the selecting unit,
- wherein the first radio communication apparatus and the radio communication apparatus belong to a same network,
- one or more basic radio channels are set for each kind of the network out of the plural channels used for radio communication,
- the radio communication apparatus belonging to the network uses radio channels included in the basic radio channels when the radio communication apparatus transmits a radio signal, and
- even when the first radio communication apparatus transmits the first signal through another radio channel without using the basic radio channels, the carrier sense unit detects, concerning the basic radio channels in addition to the plural radio channels that the first radio communication apparatus uses for the transmission, a radio wave transmitted from the second radio communication apparatus or the other radio communication apparatus.

11. A radio communication apparatus that can receive radio waves from a first radio communication apparatus and a second radio communication apparatus and performs radio communication with the first radio communication apparatus via plural radio channels, the first radio communication apparatus and the second radio communication apparatus being unable to detect the radio waves transmitted by the radio communication apparatuses to each other, the radio communication apparatus characterized by comprising:
- a receiving unit configured to receive, through at least one or more radio channels among the plural radio channels, a first signal transmitted from the first radio communication apparatus via each of the plural radio channels;
- a carrier sense unit configured to detect, for each of the plural radio channels used for the transmission of the first signal, a radio wave transmitted from another radio communication apparatus;
- a selecting unit configured to select, when the radio wave transmitted from the second radio communication apparatus is detected by the carrier sense unit, a radio channel other than the plural radio channels used for the transmission of the first signal, which are the radio channels in which the radio wave transmitted from the second radio communication apparatus is detected; and
- a transmitting unit configured to transmit a response signal for the first signal to the first radio communication apparatus via the radio channel selected by the selecting unit,
- wherein the first radio communication apparatus and the radio communication apparatus belong to a same network,
- one or more basic radio channels are set for each kind of the network out of the plural channels used for radio communication,
- the radio communication apparatus belonging to the network uses radio channels used for radio communication, and
- when a request for connection to the network is received from the other radio communication apparatus, if the basic radio channels are not included in radio channels that the other radio communication apparatus can use for radio communication, the transmitting unit transmits a signal for rejecting the connection request to the other radio communication apparatus.

* * * * *